(12) United States Patent
Beekman (10) Patent No.: US 9,779,846 B2
(45) Date of Patent: Oct. 3, 2017

(54) HIGH ENERGY RADIATION DETECTING APPARATUS AND METHOD

(71) Applicant: MILABS B.V., Utrecht (NL)

(72) Inventor: Frederik Johannes Beekman, Utrecht (NL)

(73) Assignee: MILABS B.V., Utrecht (NL)

( * ) Notice: Subject to any disclaimer, the term of this patent is extended or adjusted under 35 U.S.C. 154(b) by 0 days.

(21) Appl. No.: 14/765,756

(22) PCT Filed: Feb. 3, 2014

(86) PCT No.: PCT/NL2014/050064
§ 371 (c)(1),
(2) Date: Aug. 4, 2015

(87) PCT Pub. No.: WO2014/123409
PCT Pub. Date: Aug. 14, 2014

(65) Prior Publication Data
US 2015/0380121 A1 Dec. 31, 2015

(30) Foreign Application Priority Data
Feb. 7, 2013 (NL) ...................................... 2010267

(51) Int. Cl.
*G01T 1/24* (2006.01)
*G21K 1/02* (2006.01)
(Continued)

(52) U.S. Cl.
CPC ............. *G21K 1/025* (2013.01); *G01T 1/169* (2013.01); *G01T 1/1648* (2013.01); *G01T 1/202* (2013.01); *G01T 7/00* (2013.01)

(58) Field of Classification Search
CPC ....... G01T 1/1648; G01T 1/169; G01T 1/202; G01T 7/00; G21K 1/025
(Continued)

(56) References Cited

U.S. PATENT DOCUMENTS 4,375,695 A * 3/1983 Harding ................... A61B 6/06
378/10
6,324,258 B1 * 11/2001 Beekman .............. G01T 1/1615
250/363.04
(Continued)

FOREIGN PATENT DOCUMENTS

EP 2482101 8/2012
JP 54-151884 11/1979
(Continued)

OTHER PUBLICATIONS

International Searching Report for PCT/NL2014/050064, Aug. 5, 2014.
Written Opinion for PCT/NL2014/050064, Aug. 5, 2014.

*Primary Examiner* — Kiho Kim
(74) *Attorney, Agent, or Firm* — Nixon Peabody LLP; Jeffrey L. Costellia (57) ABSTRACT

A detection apparatus for detecting high energy radiation, preferably for detecting gamma radiation, coming from a source of high energy radiation in a detection volume, e.g. from one or more particles emitting high energy radiation. The apparatus comprises at least one detection surface configured to convert incident high energy radiation into a detection signal, and a collimator system comprising at least three collimator slits. Each collimator slit is arranged to project high energy radiation coming from a respective slit field of view of said detection volume onto said detection surface. At least two of said collimator slits extend in non-parallel directions and the respective slit fields of view of said at least two non-parallel collimator slits and the slit field of view of any other of said at least three collimator slits overlap and define a common detection volume of the detection apparatus.

4 Claims, 5 Drawing Sheets

(51) Int. Cl.
*G01T 1/164* (2006.01)
*G01T 1/169* (2006.01)
*G01T 7/00* (2006.01)
*G01T 1/202* (2006.01)

(58) Field of Classification Search
USPC .................................................. 250/370.06
See application file for complete search history.

(56) References Cited

U.S. PATENT DOCUMENTS

| | | | | |
|---|---|---|---|---|
| 6,700,949 | B2* | 3/2004 | Susami | A61B 6/4417 250/363.03 |
| 7,388,207 | B1* | 6/2008 | Zeng | G21K 1/02 250/363.1 |
| 8,178,845 | B2* | 5/2012 | Zeng | A61B 6/037 250/363.1 |
| 2002/0015474 | A1 | 2/2002 | Tybinkowski et al. | |
| 2004/0054248 | A1* | 3/2004 | Kimchy | A61B 5/055 600/3 |
| 2005/0055174 | A1* | 3/2005 | David | A61B 6/4258 702/152 |
| 2008/0237472 | A1* | 10/2008 | Uribe | A61B 6/037 250/363.1 |
| 2008/0237473 | A1* | 10/2008 | Uribe | A61B 6/032 250/363.1 |
| 2009/0010386 | A1* | 1/2009 | Peschmann | G01N 23/223 378/57 |
| 2009/0140157 | A1* | 6/2009 | Meng | G01T 1/2018 250/370.11 |
| 2009/0225945 | A1* | 9/2009 | Smither | G01N 23/046 378/71 |
| 2009/0261256 | A1* | 10/2009 | Wieczorek | G01T 1/1648 250/363.05 |
| 2009/0304150 | A1* | 12/2009 | Metzler | G02B 27/30 378/62 |
| 2010/0054412 | A1* | 3/2010 | Brinks | A61B 6/032 378/65 |
| 2011/0142315 | A1* | 6/2011 | Hsieh | A61B 6/032 382/131 |
| 2012/0061581 | A1* | 3/2012 | Hugg | G21K 1/02 250/394 |
| 2012/0091356 | A1 | 4/2012 | Oh et al. | |
| 2012/0126125 | A1* | 5/2012 | Akazawa | A61B 6/037 250/363.04 |
| 2012/0248320 | A1* | 10/2012 | Wangerin | G01T 1/166 250/363.05 |
| 2012/0314062 | A1* | 12/2012 | Hawman | G06T 11/005 348/142 |
| 2014/0079179 | A1 | 3/2014 | Takagaki et al. | |

FOREIGN PATENT DOCUMENTS

JP 56-030664 3/1981
WO WO 2012-165450 12/2012

* cited by examiner

HIGH ENERGY RADIATION DETECTING APPARATUS AND METHOD

The present invention relates to a detection apparatus for detecting high energy radiation, in particular gamma radiation, coming from a source of high energy radiation in a detection volume, comprising at least one detector having a detection surface and configured to convert incident high energy radiation into a detection signal, a collimator system and a processing unit arranged to process detection signals and to reconstruct a position of said source of high energy radiation in said detection volume on the basis of detection signals.

Such detection apparatus are known. Examples are the U-SPECT systems of MILabs BV. Although these known systems provide a high spatial resolution, this is often at the trade-off of sensitivity and reconstruction speed. Therefore, tracking of fast moving particles or cells each containing very low amounts of radioactivity and to be tracked in highly dynamical situations, such as e.g. animals or humans, is often not (well) possible.

It is an object of the present invention to provide a detection apparatus of the kind mentioned above, as well as a detection method therewith, that is able to deal with such labelled particles, cells and similar situations, in particular a faster apparatus, with still a high resolution.

The present invention achieves this object with a detection apparatus according to claim 1.

In the detection apparatus of claim 1 the detection of radiation for determination of the position of the high energy source is performed with at least three slits and not with pinholes as is often done in the prior art. Because of the very much larger cross-sectional area of a slit as compared to a pinhole, or even a set of pinholes, the sensitivity is very much increased. On the other hand, even a non-moving point source irradiates a line-shaped surface on a detection surface, constructed as the intersection of a plane, that extends through the location of the source and the slit, and the detection surface. Herein, the irradiation is a combination of individual photons of individual events. If the activity is not exceptionally low, the individual photons will act collectively as a beam forming the line-shaped irradiation surface on the detector. Then, by having at least three slits, of which at least two are non-parallel, it is always possible to reconstruct the position of a point source as the intersection of the (at least) three respective planes crossing the (line-shaped) detection position and the slits. One could alternatively say that the three slits thus defined (two slits non-parallel, the third slit more or less random) define a set of coordinates, uniquely describing positions in the (common) detection volume. Note that the common detection volumes may differ between different sets of three collimator slits, although the latter are preferably arranged such that the common detection volume remains substantially the same from slits set to slits set.

In a practical embodiment the slit width is fixed at lies between 0.5 and 5 millimeters, e.g. between 1 and 4 millimeters. Possibly the slit width is variable within such a range. Possibly the slit can selectively be closed, e.g. by provision of a corresponding shutter or by reducing the width in a variable slit width slit collimator to zero.

In a practical embodiments the slit length is between 30 and 500 millimeters.

It is noted that the prior art discloses so-called slat cameras, comprising one or more cameras each having a stack of spaced apart parallel plates forming the collimator. Such slat collimators differ from the present slit collimator as do parallel hole collimators from pinhole collimators.

In particular, in an embodiment of the present invention, the collimator system comprises at least one radiation impervious collimator plate that is arranged substantially parallel to the detection surface, the at least one plate comprising at least three collimator slits, e.g. three plates each including a single slit therein. Herein, "substantially parallel" means a collimator plate that, when flat, makes an angle of less than 45° and preferably of 0° with the detection surface, and when curved, has at least one tangent plane making such an angle with the respective nearest part of the detection surface. As an example of the latter, there may be provided a curved detection surface and a substantially concentric collimator plate.

As to the difference with the prior art, neither a slat collimator nor a parallel hole collimator can provide a magnification effect, as do the pinhole collimator and the slit collimator. Thus, a (much) better resolution may be achieved with the slit collimator, since the object or source is magnified on the detector. This also reduces blurring effects, e.g. when magnifying by a factor of 10 or more—which is preferred in the present invention—blurring effects are reduced with the same factor. Reference can be made to e.g. the article Pinhole collimation for ultra-high-resolution, small-field-of-view SPECT, Jaszczak et al. in 1994 Phys. Med. Biol. 39. Moreover, the sensitivity of a pinhole or slit is higher than for the slat collimator, when the object is close to the pinhole or slit. Furthermore, it will be obvious that a slat collimator will often be up to an order of magnitude heavier than a slit collimator, thus providing a much bulkier and less flexible set-up than with the slit collimator as in the present invention. Thus, slat collimators, comprising a stack of mutually spaced plates, are to be excluded from the present invention. Of course, they can be employed as additional detection devices, as long as at least three slits are provided in a collimator system as defined in claim 1.

In this application, the "field-of-view" is either the part of the object space that is imaged onto the detector, as also limited by the acceptance angle, or (sometimes) the extent of the image on the detector. The object field-of-view is imaged onto the detector field-of-view. The detector field-of-view is thus the part of the detector that can be irradiated by the slit, and is determined by the position of the slit with respect to the detector surface, in particular the distance, as well as the acceptance angle and width of the slit.

Furthermore, "detection surface" is intended to comprise "detector arrangement having a radiation sensitive surface". That is, "detection surface" is not to be equalled to the mathematical concept of a plane or the "outside" of a physical object, but rather to a detector arrangement that is physically radiation sensitive. It can thus comprise a body, e.g. a planar slab, of scintillator material, and so on. The detector surface is read out by an array of optical detectors to get position and energy information about each gamma interaction with the scintillator material.

It is noted that the at least three slits in the inventive apparatus of claim 1 are non-consecutive, in that the radiation from the source passes only one slit before being incident on the detection surface, and not through two or more slits that are arranged behind each other. The latter situation, i.e., in particular in crossed slits as known in the art, would represent in effect a true pinhole, but has the corresponding and much lower sensitivity than when the radiation passes through a single slit only. Rather, in the present invention there is only one plane with one, or sometimes more slits, to be passed by the radiation when travelling to the detection surface. Note that it is possible, in the present invention, to have two or more crossing slits, but they will be provided in a single common plane, e.g. as an X shaped aperture in a collimator body, and not one slit behind the other slit, thus not reducing sensitivity. Therefore, whenever crossed slits are mentioned in relation to the present invention, slits crossing in the same plane are meant, not slits in consecutive planes behind each other.

The detection apparatus of the present invention is able to provide detection signals that are easily reconstructed into one or more source positions in the detection volume. Such reconstruction can be done with any suitably programmed computerized processing unit.

Therefore, preferably, the detection apparatus comprises a processing unit, arranged to process said detection signals and to reconstruct a position of said source of high energy radiation in said detection volume on the basis of said detection signals. Thus, a complete system is formed, that can image, i.e. provide positions in space, of a moving or non-moving source of high energy radiation, e.g. of one or more high energy emitting particles. Nevertheless, it is noted that the system without such a processing unit has independent merits.

Note furthermore that the processing unit may itself be a complex computer, such as a unit that comprises a data acquisition computer, that is specifically arranged to gather position data from the detectors, and a reconstruction computer, that is specifically arranged to reconstruct position of the source (or sources) based on the acquired position data.

In particular, at least one, and preferably each, collimator slit comprises a slit aperture with a constricted profile in cross-section, such as preferably a knife-edge profile, and thus defining an acceptance angle with said respective slit field of view for said collimator slit. Although the cross-section of a slit aperture is not particularly limited, having a constricted profile, such as preferably a knife-edge profile, offers the advantage that the (slit) field of view, on the detector and in the detection space, is well-defined. However, other possibilities for the profile, such as a double horn-shape with rounded edges, are not excluded. Unconstricted profiles, such as with parallel faces of the slit aperture, are considered less desirable due to their very small acceptance angle (if any), requiring a large number of slits and complex reconstruction. In order to be able to locate the source of high energy radiation in the detection volume, the slit fields of view of the slits involved in the positioning should advantageously overlap in the detection space such that the location(s) of interest is(/are) within each slit's field of view. Herein, location(s) of interest are the positions where a source of high energy radiation is present within an object such as a small animal, e.g. a mouse, or a human, which high energy radiation is after all often the only radiation detectable by the device according to the invention, apart from additional detectors.

In an embodiment the system comprises an support device adapted to support an object, e.g. a small animal, containing the source of high energy radiation, e.g. a mobile support device provided with a motion device allowing to move and/or position the object in the detection space. Preferably the object support or a part thereof is translucent for high energy radiation so as to not interfere with the detection.

In the present invention the high energy radiation is preferably gamma radiation, in particular form radioactive decay, such as with energies between 20 and 511 keV, although no strict limits are intended.

In a practical application one may envisage the step of providing multiple high energy emitting particles, at least some of said particles having a different type of source of high energy or a different energy level (keV) than some other of said particles, wherein the detection apparatus is embodied to distinguish between said different particles.

In embodiments, at least two collimator slits extend in respective directions that subtend there between an angle of at least 10°. Although it suffices for there to be a non-zero angle between two non-parallel slits, it is advantageous if that angle is at least 10°, which will allow a sufficiently precise location of the intersection of the two corresponding planes, since there will always be some uncertainty around each plane. The case of an angle that is so small as to cause more uncertainty than desired would result in an "ill-posed" inverse problem with respect to estimating the particle position in detection volume. Preferably said angle is at least 30°, more preferably substantially 90°, as this will provide the best accuracy for locating with crossing planes. Note that such angles should preferably hold where the respective planes, defined as extending through a respective slit and the corresponding detection position, cross in the detection space. In other words, the planes should subtend at least the mentioned angle at the average source position in the detection space/volume. Of course, these planes are different for every detection position, thus for every different source position in the detection space. It is however preferable if the angle is in the mentioned range on average for the detection space. Even more preferably, the detection apparatus comprises three mutually perpendicular collimator slits, or such that on average these three planes through the respective slits and the respective detection position (and of course the source position) are perpendicular, as in this case each separate coordinate can be determined with high accuracy, due to all planes intersecting perpendicularly. Note that having more slits is possible, for increased detection sensitivity and better redundancy in the process of locating the source of high energy radiation, but then not all planes can be perpendicular. It is, however, possible to have e.g. three groups of parallel slits, wherein the average planes through these slits in each group are substantially, and as much as possible, perpendicular to the planes through the slits in each of the other two groups.

It is possible to have a detection apparatus, wherein the collimator slits on the one hand and said common detection volume on the other hand are arranged such as to be separated by a single imaginary separating plane. This means that one can draw a plane with the common detection volume, or at least a large part thereof, on one side of the plane, while having the collimator slits, or at least those involved with the localization of the source, on the opposite side of the plane. An example would be where all slits and the corresponding detection surface(s) are positioned in a certain volume, all slit fields of view facing upward, and the common detection volume being positioned above all slits. Such a set-up allows a high degree of freedom for detection, as in principle all of space on said side of the plane is available for handling the source, and so on. A useful example hereof includes tubes and piping for investigation. E.g. a tube contains a flow of a liquid with one (or more) radioactively marked particles. The interaction of those particles with other, unmarked particles in the flow can be detected and investigated. This could even involve an existing tube or the like, as the detection apparatus may be positioned onto the tube from any side.

Another, alternative embodiment comprises a situation wherein there are two planes, with at least a part of the detection volume positioned between the two planes, while each of the collimator slits is separated by one of the planes from said part of the detection volume between the planes. In other words, the space between the planes is available, e.g. for one or more additional detectors. Preferably, though not necessarily, the planes run substantially parallel.

In important embodiments, the detection apparatus further comprises an additional detection system, arranged on the same side of said single imaginary separating plane as the common detection volume. Having such space around the common detection volume available opens up the possibility to provide an additional detection device there, for further investigating different parameters within the common detection volume. In particular, the additional detection system comprises an X-ray CT-scanner, a PET scanner, one or more X-ray cameras, an MRI scanner or an optical imaging system. In particular a CT-scanner provides the advantage that it offers imaging of turbid fluids or particle systems, whereas optical systems excel in accuracy and speed.

In some embodiments, the detection apparatus according to the invention further comprises at least one gamma camera with holes, in particular a pinhole camera, a focused pinhole camera, a parallel hole camera, a fan beam camera or a cone beam camera, respectively comprising a pinhole or a focused pinhole collimator having a plurality of pinholes with respective pinhole fields of view overlapping in a common pinhole field of view, preferably at least partially overlapping said common detection volume. Such a "conventional" gamma camera, e.g. the focused pinhole camera, may be an additional system as are the abovementioned detection systems, and may serve to better determine a more complex (non-sparse) distribution of sources. The detection apparatus according to the present invention itself, i.e. with the slit collimators, functions well for sparse data, where one or a few sources are present. After all, the three coordinates each of numerous sources are difficult to discern without lots of additional knowledge. However, including at least one of the above mentioned cameras in the apparatus according to the invention offers a way to determine more easily the distribution of such numerous sources. This may be helpful in cases in which the number of sources increases during the experiment, such as in pharmaceutical testing in humans or animals, where radioactively marked pharmaceuticals collect in certain tissue, such as the heart or in a tumour. Having both a fast detection system for (almost) real-time monitoring and an additional camera with holes (e.g. one or more pinholes, crossed overlaying slits, or parallel holes) for conventional distribution determination offers a high versatility. A particular embodiment would be a focused pinhole camera system such as a U-SPECT camera with a detection volume, provided with one or more slits that also image the detection volume. This increases sensitivity very much. And in other words, such embodiment could be the detection apparatus of the invention, combined with a focused, multi-pinhole detection system, such as in particular a U-SPECT system.

As said above, said at least two non-parallel collimator slits and any other of said at least three collimator slits are used to determine the position of the source in the (common) detection volume. To determine the coordinates, one needs a coordinate system. Each slit determines a direction of a coordinate axis of the common detection volume. The scale along the axis is arbitrary, and can be set as desired. Then, advantageously, the processing unit is arranged to determine a value of at least one coordinate for said source of high energy radiation on the basis of the position on the detection surface of the detection signal. Herein, a detection signal as determined on the detector corresponds to a source position on a plane through said detector signal position and the slit. As the slit is, in principle, fixed or at least at a known location, the detector signal's position on the detection surface determines thus the relevant coordinate along the corresponding coordinate axis. This will be elucidated more in the drawings.

Advantageously, the detection surface comprises one or more flat surfaces, which allows easier processing of the signals, although curved detection surfaces are not excluded. In particular, and as is common in the field for detectors per se, said detection surface is position sensitive, in that it is able to distinguish in at least one dimension the positions on which radiation is received. Thereto, the detection surface comprises a plurality of sub-detectors arranged preferably in substantially parallel lines. The sub-detectors may be individual pixels of a CCD or photomultiplier tube array, or the like, that are almost always arranged in rows and lines. The array may be oriented randomly, but preferably substantially parallel to the collimator slit via which said sub-detector is reachable by said high energy radiation. This allows easier processing, since a complete line of pixels offers in principle the same information as a single pixel in that line, but may be read out as one single signal, which is faster and easier. Herein, the array of sub-detectors may also comprise a row of elongate detectors, such as photoresistors or -tubes, or other long detectors, which can be made very sensitive and fast. In an important embodiment, the detection surface comprises a plurality of elongate parallel scintillator crystals, coupled at an end thereof, or at another part thereof, with an optical receiver, such as a PMT or with a pixel of a CCD camera. Preferably, again, such scintillator crystals are arranged parallel to the respective slit through which they receive radiation. An important advantage hereof is that, since the radiation for a certain position of the source is provided in a line shape anyway, all that information for one source position can be obtained in one single sub-detector, such as in this case the scintillator crystal. The optical radiation generated in the crystal is then at least partly transported, preferably via total internal reflection, to e.g. the end(s) of the crystal, where the receiver(s) collect(s) the radiation and generates the detection signal. This is a very sensitive, fast and effective set-up for the detector.

In embodiments, the detector apparatus comprises at least two, preferably at least three, cameras, each camera comprising at least one of said collimator slits and a part of said detection surface arranged to receive high energy radiation through said at least one collimator slit. This more or less modular design allows optimum freedom to adapt and adjust each camera to the situation, object and (common) detection volume desired. For example, one can easily adjust a magnification factor without giving up a certain angle between projections through two neighbouring slits, since each slit and camera can be positioned as desired. Preferably, or typically the apparatus comprises three or four cameras arranged in a triangle, such as in the MILabs U-SPECT system mentioned above, or square or rhombus (in particular lozenge) shape, respectively. Herein, the slits will not all run along the same line in order to be able to determine all three coordinates of the source. Such embodiments have three or four cameras with typically in all three or four slits, which suffices to determine positions uniquely, while being a very simple set-up with high flexibility. Of course, other numbers of cameras are also possible, such as two cameras, wherein one camera has one slit and the other camera has two slits. It is also possible to have just a single camera, with e.g. two parallel slits and one slit subtending an angle with the other two.

In particular embodiments, the processing unit is arranged to record times of incidence of said detection signals for at least one, and preferably for each, collimator slit, and the processing unit is arranged to reconstruct a coordinate value for the corresponding collimator slit in dependence of said times of incidence. In the case of a plurality of detectors, they will be synchronised to be able to process their respective timed detection signals. In those cases where there are no simultaneous detection signals for all three (or more) slits/detection surfaces, one is still able to determine the position of the source. Thereto, one has to know one or two other coordinates at the time of the other (two) coordinate(s). This can be achieved by recording the respective signals, processed into coordinates or not, as a function of time, and then interpolating one or two coordinates to provide a (respective) coordinate value at the desired time. Of course, this will provide slightly less accurate results, depending on the time resolution of the measurements. However, this can be taken into account by e.g. providing a sufficiently intense source, or also by using knowledge about constraints, such as a maximum velocity of a particle/source or the like, i.e. a particle cannot suddenly "jump" from one position to another. Such knowledge may also be used to discern different sources and detection signals for coordinates thereof with only few measurements. Note that all this is not necessary for stationary sources.

Advantageously, and as hinted at above, the processing unit is arranged to determine said position of said source of high energy radiation in the common detection volume as a function of time on the basis of said determined coordinate values. This may then be used to determine the value of the "missing" coordinate(s) for any desired time, as outlined above. Then, also advantageously, the processing unit may be arranged to determine, or: estimate, at least one of a trajectory and a velocity as a function of time, for said source of high energy radiation. An advantage of the present apparatus is its high sensitivity combined with its high speed, which makes it very suitable for tracking particles in highly dynamic circumstances. By being able to determine coordinates fast, the apparatus thus provides the possibility to determine many positions in a short time, i.e. determine a trajectory, and based on that also the velocity as a function of time.

In particular embodiments, the collimator system comprises a slab or body of radiation impervious material, and a rotatable collimator slit member of radiation impervious material comprising a slit, and a rotator or rotary drive for rotating the rotatable part. The rotatable member is rotatable in a cavity in the slab or body around a rotation axis parallel to the slit. In a first rotary position high energy radiation is able to pass the slit from the detection volume to the detection surface and in a rotary second position high energy radiation is blocked from going from the detection volume to the detection surface.

In a preferred embodiment the first and second rotary position differ by a rotation over substantially a right angle.

It is expressly noted that such a collimator system has a value independent of the present invention according to claim 1 but can also be integrated therein.

The advantages described below may also be applied in other detection apparatus than the present detection apparatus. Such advantages comprise a simple set-up for a flexible slit collimator system. Herein, the slit can be closed or opened as desired, simply be operating a rotating mechanism, which may be a direct connection to the rotary drive, or via a chain, a gear or any other drive mechanism.

It may be advantageous if the collimator system comprises a (much) higher number of slits than just three. For example, if there are six slits, in three sets of two slits each, one can envisage that in each set or pair a first slit is arranged to have a first magnification factor and the other second slit arranged to have a second magnification factor different than the first slit. In a practical embodiment this can mean that three slits arranged relatively close together near or about the detection volume, while another set of three slit is provided further spaced apart.

By allowing for a selective opening of all, or at least some of the slits, one can then easily adapt the apparatus to a different magnification factor, e.g. by using either the first or the second slit of each pair of slits. Herein, the other, non-desired slits may e.g. be closed by rotating the rotatable member wherein the slit may be provided Alternatively or additionally, one can change the sensitivity by opening or closing a number of slits above the number of three.

In an alternative embodiment, the collimator system comprises at least one slit having an adjustable or variable slit width, preferably further comprising a slit width adjuster or variation mechanism. This allows to set a sensitivity of the system, which may be important since coordinates are detected separately and are hardly correlated.

For example, the rotatable slit collimator member may comprises two portions defining opposed longitudinal edges of the slit, that are arranged moveably with respect to each other to allow for variation of the slit width, such as for example translatable relative to one another. The slit width adjuster or variation mechanism may comprise for example an adjustable distancing mechanism, such as a piezoelectric distancing mechanism, a spindle mechanism or the like mechanism.

Another important advantage of the rotatable collimator slit member is that it may allow for variation of the angular position of the member for the purpose of following a radiation emitting particle of interest. Thereto, the processing unit may operatively connected to the rotator or rotary drive. The location of interest, as determined by the processing unit, may then be used to "point" the field-of-view of the slit by suitably turning the rotatable collimator slit member. The present invention also relates to a method for following or tracking a high energy radiation emitting particle wherein use is made of a rotatable collimator slit member, and wherein the angular position of the slit member is varied in the course of the following or tracking of the particle.

The present invention also relates to a detection apparatus for detecting high energy radiation, preferably gamma radiation, coming from a source of high energy radiation in a detection volume, e.g. from one or more particles emitting high energy radiation, according to claim 18. If desired, such apparatus can be combined with the apparatus of claim 1.

The invention also relates to a method of detecting high energy radiation, e.g. to determine at least a position of at least one source of high energy radiation, in particular gamma radiation, coming from a source of high energy radiation in a detection volume. In the method according to the invention, use is made of a detection apparatus according to the invention. The method may comprise determining at least one detector signal for each of at least two collimator slits that extend in non-parallel directions and for any other of said at least three collimator slits. On the basis thereof, respective coordinate values may be determined, to thereby determine the position of the source of high energy radiation in the (common) detector volume. This may be done by hand or, preferably, automated by means of a suitably programmed computer. The method may in an embodiment also be employed to determine any of the speed, direction, trajectory, of the source, e.g. of a high energy radiating particle, e.g. a particle in a fluid stream.

In embodiments, the method comprises providing a plurality of particles in said detection volume, each provided with a different type of source of high energy. This allows to discern such particles even if only part of the required detection signals/coordinate data are available for the particles at any one time. The different types may comprise different types of marker, emitting radiation with a different signature. It is also possible to provide the various particles with different amounts/intensities of one and the same marker type. Then, a higher or lower intensity is an indication of the particle as well, keeping in mind though that having a particle nearer also means a higher intensity, so a correction for distance from the detector has to be made.

Another way of discerning a plurality of particles is to use prior knowledge about a position of the particles. This knowledge may be gained with other detectors that are able to determine a distribution of particles, such as a gamma camera with holes instead of slits. These are slower, and thus cannot be used so well for tracking. However, they enable to distinguish a set of detector signals for the various coordinates as a single particle, and another set of coordinate values as belonging to a second particle, a third, and so on. After an initial image by the additional detector, the tracking can continue with the slit detectors alone or the combination of signals resulting from radiation passing through slits and holes is used part of the time or all the time. Another way of distinguishing which set of coordinates belongs to a particular particle could be to use redundancy, in the form of more than three slits. If one takes all detected coordinate values of three slits, with for each slit e.g. N values, then there are N particles. When the exact positions are not known, then, in principle, each value for each coordinate may be combined with one value each of any of the other coordinates, in total however still leading to the N particles. Adding another slit, and thus a different coordinate value, may not lead to more particles, i.e. possible positions in space. This limits the possible combinations of the original sets of 3 coordinate values to the true positions in space of the N particles. But whether it be by intensity, energy of the marker, an initial image, redundancy slits or any other way, the positions of a plurality of sources (particles) may be tracked with the present detection apparatus.

Various embodiments and optional features thereof are described in the appended claims, as well as in the following description of the drawings, together with some of their advantages.

The invention as described hereinabove will now be explained in more detail with reference to non-limiting exemplary embodiments, reference being made to the appended drawings, in which.

Figure 1:
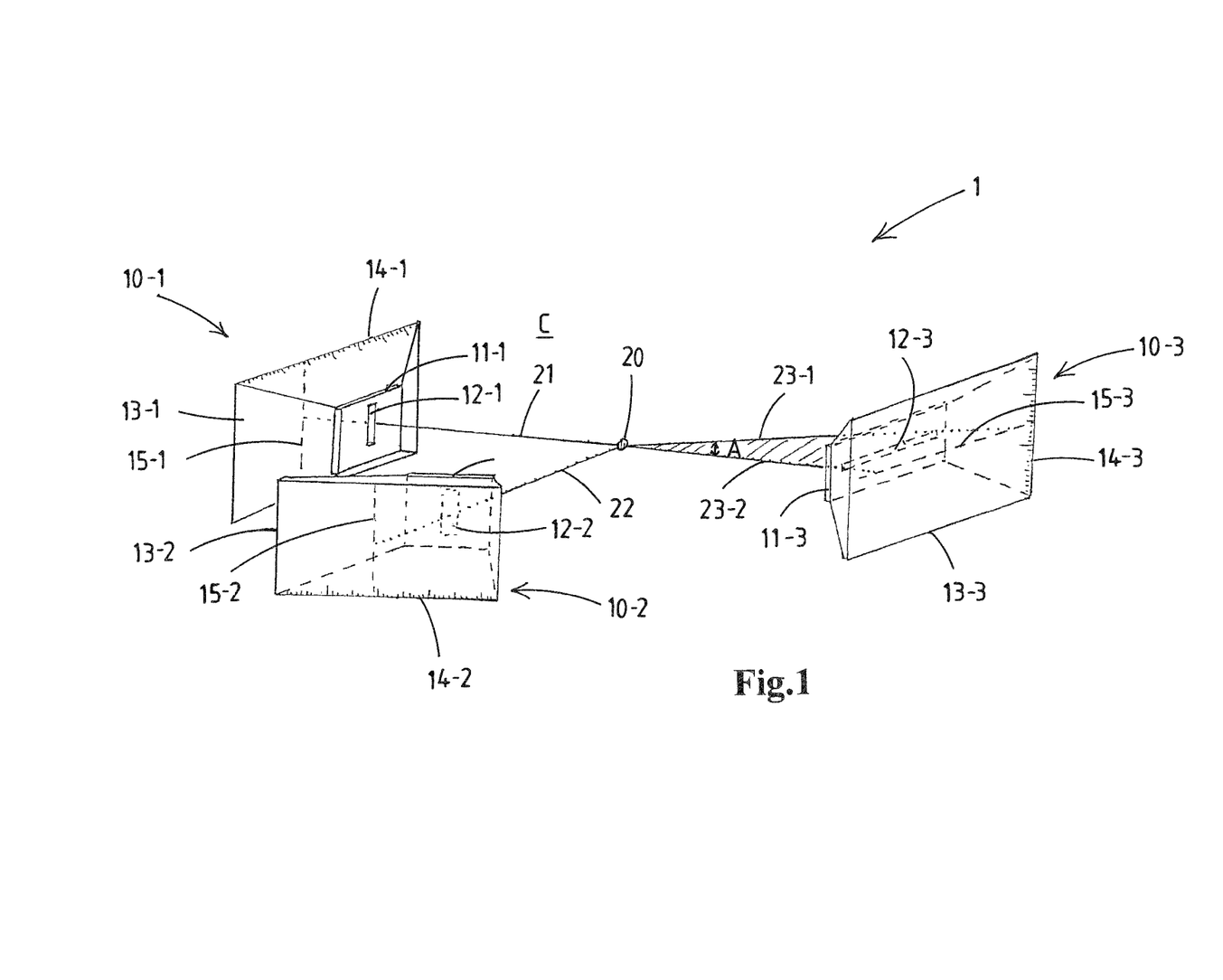
FIG. 1 shows a diagrammatic perspective view of a first embodiment of a detection apparatus according to the invention.
Figure 1A:
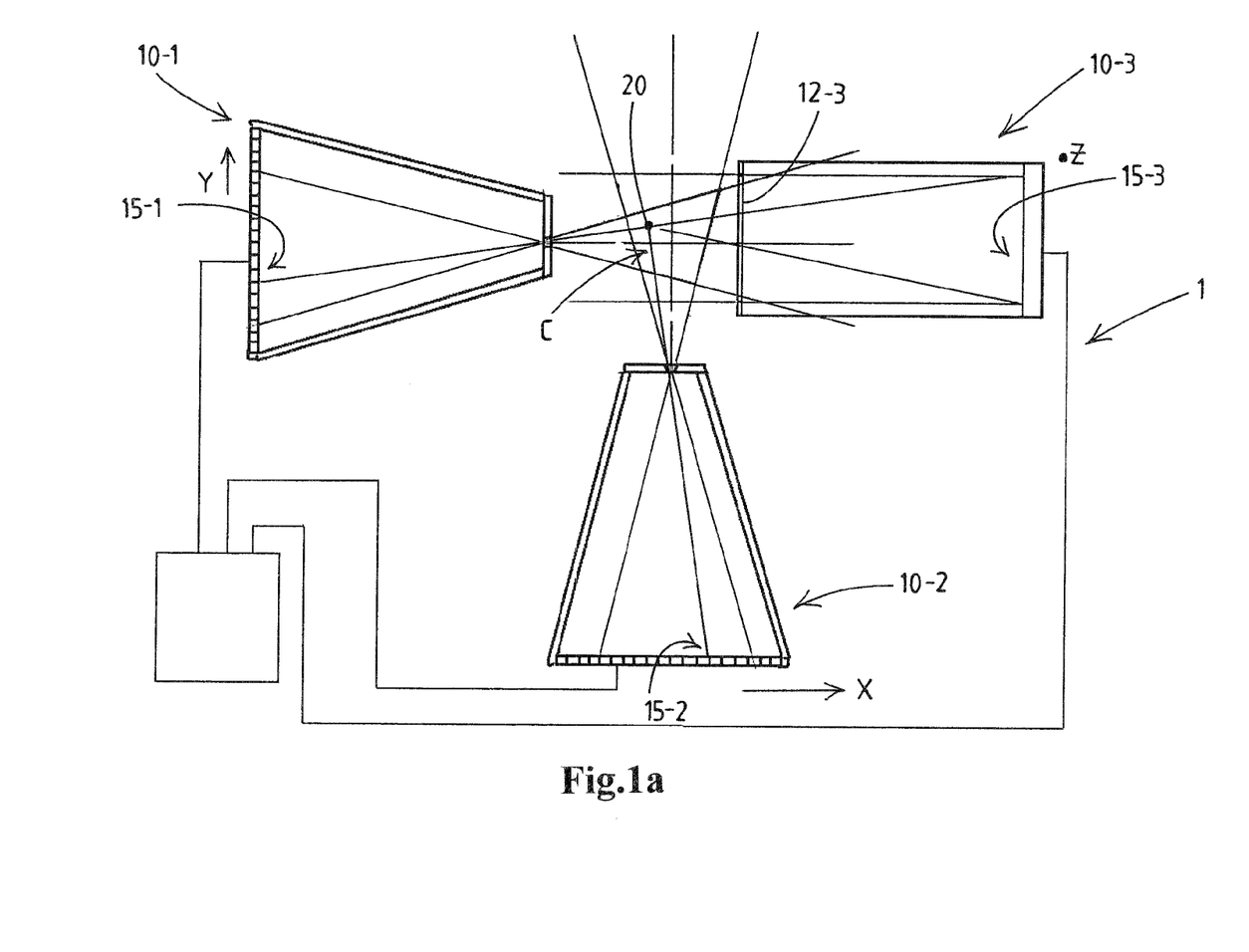
FIG. 1*a* shows the first embodiment in plan view.

FIGS. 1 and 1*a* show a diagrammatic perspective view and a plan view of a first embodiment of a detection apparatus according to the invention, generally denoted 1. Herein, as in the following, the apparatus 1 comprises three camera devices 10-1, 10-2, and 10-3. In general, the suffix "-n" means that the respective part is comprised in camera device n. This suffix will not always be used, even when a plurality of similar parts is present and shown. For example, camera device 10-1 comprises a housing with a collimator 11-1 with a slit 12-1, as well as a position sensitive detector 13-1.

Furthermore, there is shown a source 20 of high energy radiation, for example a particle emitting high energy radiation. A ray 21 of high energy radiation emitted by the source passes the slit 12-1 and hits the detector 13-1 on a position along line 15-1, which line indicates the possible positions for possible rays emitted by the source 20 to hit the detector 13-1, as long as the source 20 is stationary on the position as shown. This line 15-1 is the one along which a detection signal will be generated on the detection surface, by converting a high energy ray, in particular a gamma photon or the like, into an optical signal, e.g. by means of a scintillation crystal, or an electrical signal. Some details will be further explained below, but it is understood that the detection per se is known to the skilled person.

The line 15-1 represents a position along a scale 14-1, for reading that position as a coordinate value.

Here, camera device 10-1 with the slit 11-1 provides a reading of a first coordinate, in this case roughly comparable to a y-coordinate. Similarly, the source 20 emits a ray 22 that passes slit 12-2 of the collimator 11-2 of the camera device 10-2, and hits the detector 13-2 on a position along the line 15-2 of possible positions for this source position. This line 15-2 provides a reading of a second coordinate, here roughly comparable to an x-coordinate, with respect to a scale 14-2.

As is preferred, the slits 12-1 and 12-2 are parallel to one another, but this is not a necessity.

The camera device 10-3 is arranged to provide a reading in z-direction. The slit 12-3 of said camera device 10-3 is non-parallel to the other two slits 12-1 and 12-2. As is preferred the slit 12-3 is perpendicular to the slits 12-1 and 12-2.

FIG. 1*a* shows the respective slit fields of view of the camera devices 10-1, 10-2, and 10-3. In this example, as is preferred, each slit has a slit aperture with a knife-edge cross-section, so that the field of view is bounded by two diverging boundary planes when looking from the slit towards a detection volume.

In FIG. 1*a* it is depicted that the slit fields of view of these three slits overlap to define a common detection volume C, here shown in plan view. Source 20 is shown to be within said common detection volume.

In general, source 20, e.g. a particle in a fluid or fluid stream, will emit many, many rays of high energy radiation, and still a large part thereof, i.e. a high number of rays, will be able to pass the various slits. This has been indicated for camera device 10-3, where a range of rays between extreme rays 23-1 and 23-2 has been indicated, subtending an angle A, that are able to pass the slit 12-3 of the collimator 11-3 of the camera device 10-3, and form a line 15-3 on the detector 13-3. This clearly shows that all possible rays emitted by the source 20 that are able to reach the detector 13-3 will have the same third coordinate, here corresponding to a z-coordinate, since they all provide the same reading along the scale 14-3.

Note that a number of simplifications have been applied here. Usually, the camera devices will be relatively bigger, thus imaging a larger piece of the (common) detection volume, i.e. the collection of possible positions for the source to be detectable (by at least three slits that uniquely define the source position). Furthermore, often, the camera devices will have a much larger magnification factor, and the distance between the collimator and the detector of a camera device will often be larger than the distance between the (average) source position and the collimator of said camera device. For example, as preferred, said magnification factor is 10 or more.

Furthermore, it is also possible to combine two slits in one collimator body, or even three slits in a single collimator body. In the two slit case, the slits may be mutually parallel, e.g. as slits 12-1 and 12-2, as long as there is provided a third slit that is not, e.g. combining camera devices 10-1 and 10-2 into one camera device. These two slits may also be provided subtending an angle with respect to each other. Herein, they may even cross one another to form an X-shaped opening in the collimator body. Note in particular that, although these may be called crossing slits, this variant is not to be equaled to two crossing slits that are provided in separate collimator plates, one behind the other, thus in effect providing a pinhole. Herein, the advantage of the invention with respect to sensitivity and speed would be lost. After all, most pinholes have a surface area of about 1×1 mm$^2$, while a slit may have a similar width, but a length that is easily a factor of 50 to 500 longer.

FIG. 1a schematically depicts a possible embodiment of the detector of one or more of said gamma camera devices, wherein the detection surface is composed of a plurality or array of sub-detectors, e.g. scintillation elements, in an arrangement substantially parallel to one another. Here elongated scintillation elements are shown schematically in side-by-side arrangement with each sub-detector being elongated and being arranged substantially parallel to the collimator slit via which said sub-detector is reachable by said high energy radiation. This achieves a one-dimensional position sensitivity of the detector. If desired two-dimensional position sensitive detectors may also be used in the present invention.

Figure 2:
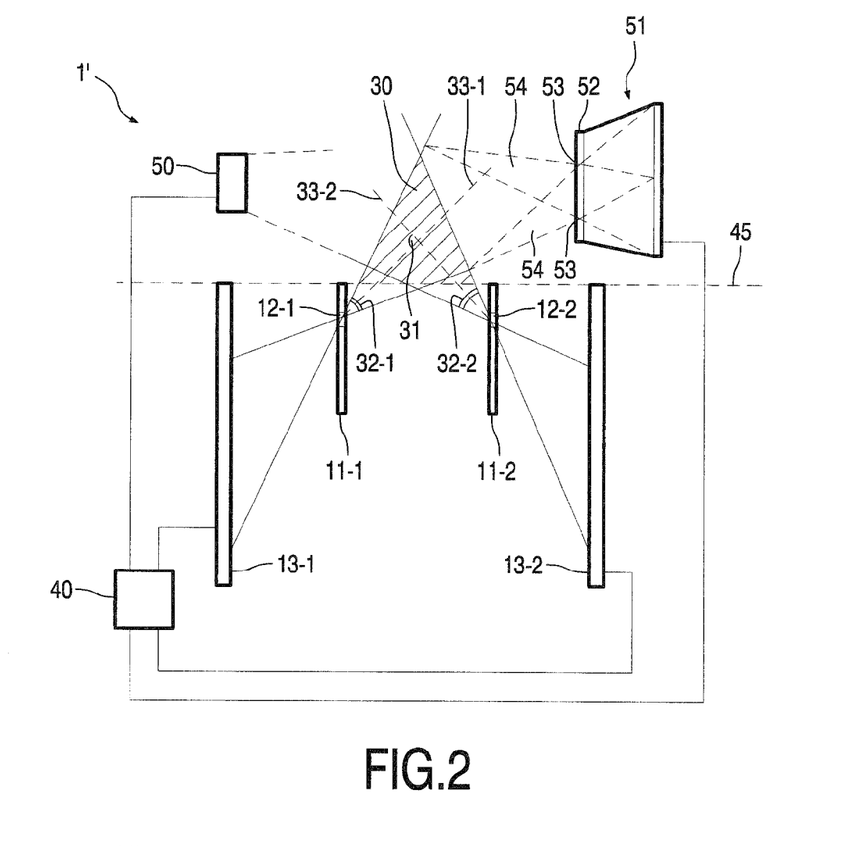
FIG. 2 shows a diagrammatic side elevational view of a second embodiment of a detection apparatus according to the invention.

FIG. 2 shows a diagrammatic side elevational view of a second embodiment of a detection apparatus 1' according to the invention.

Herein, for clarity a detection apparatus 1' with only two slits is shown. In particular, the detection system comprises two camera devices, each with a detector 13 and a collimator 11 with a slit 12. Furthermore, there is shown a hatched common detection volume 30 with a center 31 which are formed by the overlapping of the respective fields of view 32-1 and 32-2, and by the intersection of the respective angle bisectors 33-1 and 33-2, shown as dashed lines, that divide each field of view in two. Note that the bisectors are actually planes, parallel to the slits 12. They intersect in a line, which shows as a center 31 when viewed from the side. Of course, when completing the device with a third (or further) slit, the intersection of the angle bisector plane with the intersection line will cause the common intersection to be a point in space.

It is noted that the angle bisectors 33-1 and 33-2 subtend an approximately right angle at the intersection. This means that, considered on average over the common detection volume 30, also the planes through a position of a source (not shown here) within the common detection volume and the respective slits 12-1 and 12-2 will make an approximately right angle, or at least a relatively large angle. This in turn means that the accuracy when determining a respective coordinate on the respective detector will on average be largest, because even a small shift in position will cause a large shift on the detector.

Another remark to be made is that the camera devices are set up asymmetrically, causing the respective fields of view 32-1 and 32-2 (also called acceptance angles) to point upwards. They are arranged such that the common detection volume 30 is on one side of an imaginary separating plane 45 and the collimator slits 12-1 and 12-2 are on the opposite side. This allows to provide one or more additional detection devices, here a CT scanner 50 and a focused pinhole camera 51 also around the common detection volume 30. Note that the CT scanner 50 is indicated only diagrammatically, as it usually consists of a source and a detector on opposite sides of the volume to be scanned, i.e. the common detection volume 30.

The focused pinhole camera 51 is shown here very diagrammatically, with a pinhole collimator 52 with only two pinholes 53, with respective pinhole fields of view 54 that arranged to overlap with the common detection volume 30. In practice, there can be many more pinholes, or, on the other hand, only a single pinhole. Furthermore, it is also possible to provide one or more of the pinholes in the slit collimators 11-1 or 11-2, or in an additional plate provided at the same side of plane 45. In any case, the pinhole camera 51 (focused multi pinhole, or non-focused or single pinhole) may e.g. be used to image a starting position of multiple sources of high energy radiation in the common detection volume 30, after which the multiple particles may be tracked by means of the fast and sensitive detection apparatus of the invention.

Figure 3:
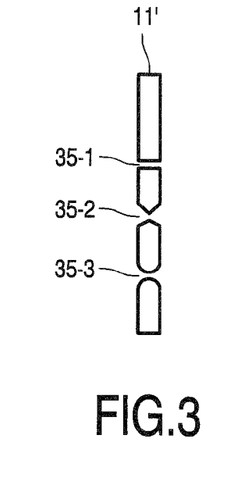
FIG. 3 shows a cross-sectional detail of a slit collimator's profile.

FIG. 3 shows a cross-sectional detail of three profiles of a slit collimator 11', two of which are advantageous for use in the present invention.

The slit collimator 11' shown here has—merely by way of illustration—three kinds of profile for the slit. The upper slit 35-1 has straight and parallel walls, that may be compared to a pinhole in a parallel hole collimator. Such a "parallel slit" 35-1 has a very narrow field-of-view and a less well-defined cut-off of that field-of-view, but most importantly a low sensitivity, and is not desirable for use in the present invention, even though it can be machined very easily, and can easily be made with an adjustable width.

The slit profile 35-2 in the middle of FIG. 3 has a knife-edge design. It has a well-defined field of view, thus in average a much higher sensitivity than the parallel slit type. The knife edge is the profile of choice for the present invention, even though others are not excluded, such as the third and lowest slit profile 35-3, which is a rounded edge slit type.

In a design with a mechanism to vary the width of the slit, the slit can have a variable field of view, which may be advantageous in some cases.

Figure 4:
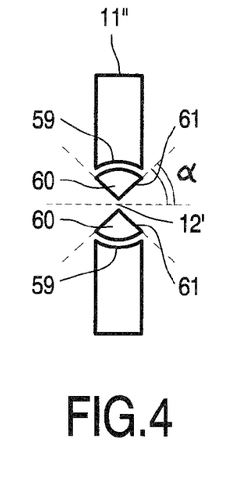
FIG. 4 shows a cross-sectional detail of a rotatable slit collimator.

FIG. 4 shows a cross-sectional detail of a rotatable slit collimator 11", comprising, as many known collimators, a slab or body of radiation impervious material, such as lead or tungsten. A cavity with two semicircular faces 59 has been machined into the collimator body, in which a rotatable slit collimator member is mounted rotatably. The slit collimator member comprises two parts 60, that fit into the cavity, and that have faces 61 arranged such as to define a knife-edge slit 12' there between, with a field of view/acceptance angle 2a. The slit member 60 can be positioned in the "open" position as shown, or in a "closed" position, turned over an angle of 90° around a rotation axis in the middle of and along the slit. This is further elucidated in FIG. 5.

Figure 5:
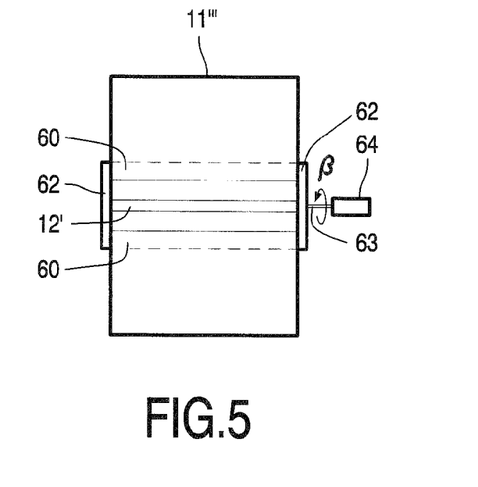
FIG. 5 shows a front view of the detail of the collimator of FIG. 4.

FIG. 5 shows a front view of the detail of the collimator of FIG. 4. It can be seen that the two parts 60 are connected to end plates 62, that can be turned around an axle 63 by means of a rotator 64, such as an electromotor. Rotator 64 could also be any other type of motor, or simply a mechanical winch, handle or the like.

Figure 6:
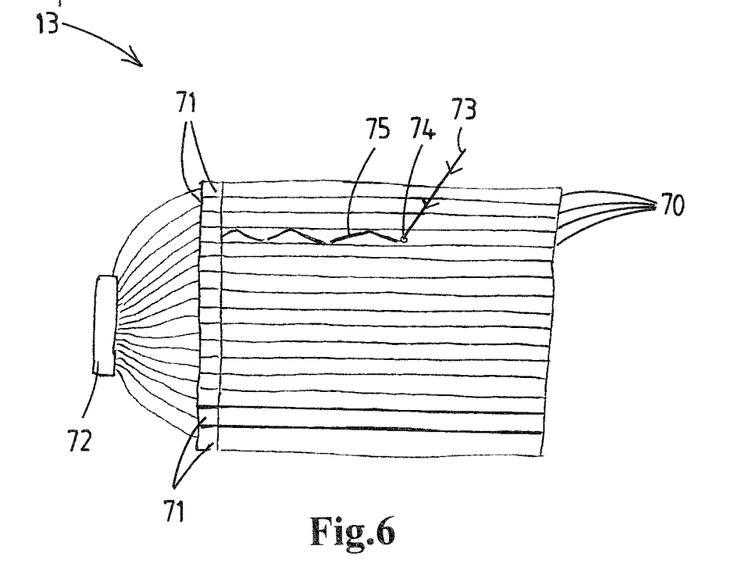
FIG. 6 shows a diagrammatic top view of a detector for use in the invention.

FIG. 6 shows a diagrammatic top view of a detector 13' for use in the invention. Here, the detector 13' comprises a large number of parallel line detectors e.g. scintillation crystals 70, each terminated by a photodetector 71, such as a photomultiplier tube, silicon Photomultiplier and apd or a pixel of a (1D) CCD or CMOS array. For increased sensitivity the crystals 70 could be terminated at both ends by such photodetectors 71. Each of the latter are connected to a read-out device 72, that is either comprised in the processing unit (not shown here) or supplies its readings to that processing unit.

In use, a high energy ray/photon 73 coming in along the arrow line strikes a scintillation crystal 70, and generates optical radiation therein at position 74. Part of the optical radiation will escape, but some optical radiation 75 will be guided, by total internal reflection, towards the corresponding photodetector(s) 71 and cause a detection signal that is read out by the read-out device 72. Note that the high energy rays/photons will strike the detector 13' under an approximately right angle, and thus in principle only one of the crystals 70. Thus, all of the generated optical radiation will be generated in that one crystal, so that there will be no trouble with a depth-of-interaction problem. This gives a very high and specific sensitivity, in particular when the crystals 70 are made relatively deep. And since the high energy rays/photons that can reach the detector 13' for a certain position of the source of high energy radiation is a line, arranging the crystals 70 parallel to such lines allows a very simple and sensitive way to determine which line is hit by the rays/photons 73. Thereby, it is very easy to determine the corresponding coordinate value, which corresponds in a one-to-one fashion, though not necessarily linearly, to the number of the crystal 70 in the array of crystals. It is to be remarked that this detector 13' is just an example of a useful position sensitive detector for the detection apparatus of the invention.

Figure 7:
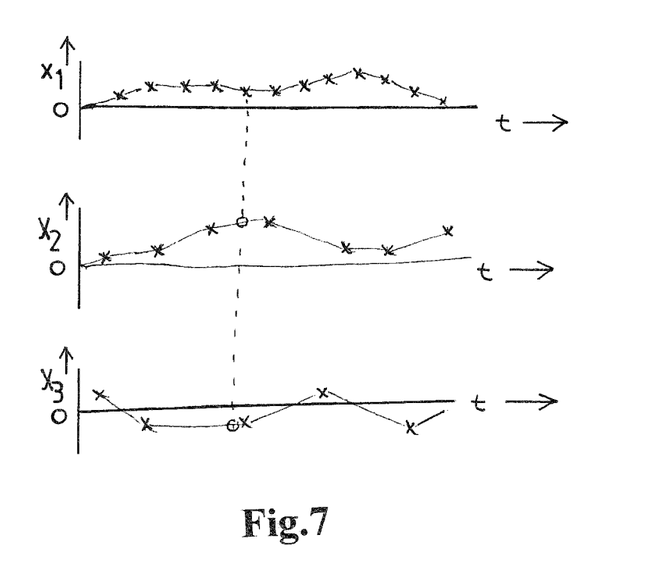
FIG. 7 shows a diagrammatic example of detection signals.

FIG. 7 shows a diagrammatic example of detection signals, for example detection signals that have been determined by means of the above described devices and/or procedures. Here, three detector signals have been shown, designated x1, x2 and x3, in each case as a function of time. For simplicity, each detection signal is given as a number of discrete signals, indicated by crosses, that have been connected by linear interpolation, although in practice it will almost always be such a high number that the signal is more or less continuous. The method to be discussed here below holds in particular for those cases where there really is a discrete signal, such as in low-dose experiments, such as in humans. For signal x1, a relatively high number of signals has been detected, indicated by the high number of crosses, while for x2 and in particular x3 that number is lower. This may e.g. be caused by a larger distance to the respective slit. In any case, let us assume it is desired to determine the position of the source at time t=T1. Then the respective coordinate values are obtained by reading in the graphs, when necessary interpolating between measurements. This provides the (approximated) coordinate values as determined on the detector(s). From those values, it is possible to reconstruct the corresponding position in object space by simple geometrical relationships, e.g. by calculating the position at which the planes cross that correspond with a certain slit and a certain estimated detection position. It will be clear that such a reconstruction can be done very quickly. And since the reading out of just one coordinate value, or better: a corresponding value of a line shaped signal on a detector, is also very simple, sensitive and fast, the tracking of a particle is very easy.

Without any additional measures, the tracking of multiple particles, and in particular deciding which coordinate value belongs to which particle, is not always trivial. However, as mentioned before, by providing additional slits, and thus redundant coordinates, or by providing reference images by means of additional position sensitive camera such as a camera with holes, and so on, distinguishing between particles/sources and tracking same is relatively easy/possible. And the feature of tracking particles at this speed is a great advantage of the present invention.

Figure 8:
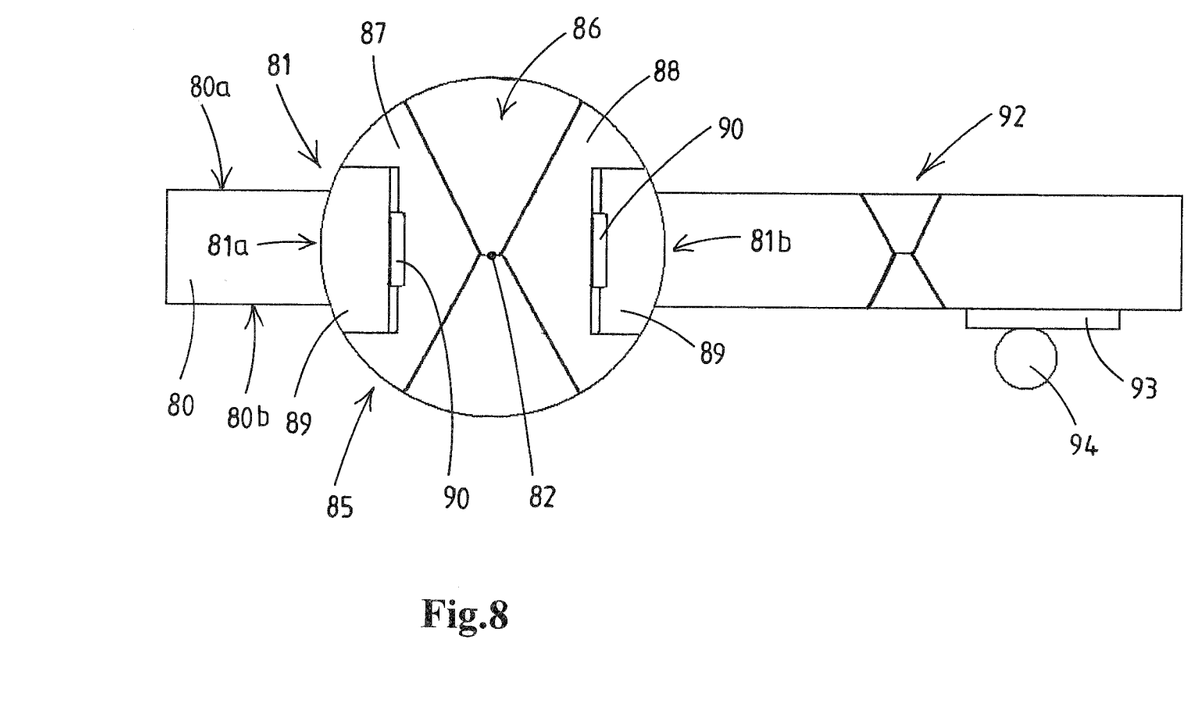
FIG. 8 shows diagrammatic in cross-section a collimator according to the present invention.

With reference to FIG. 8 a collimator system according to the invention will be discussed.

FIG. 8 shows a collimator body 80, e.g. a slab, of radiation impervious or opaque material, which body has a front face 80a direct towards the detection volume and an opposed rear face 80b.

The body 80 has an elongated cavity 81 therein with a cavity axis 82. This cavity has opposed cavity faces 81a, 81b, preferably semi-circular as depicted here. The cavity forms an elongated passage through the body with a slot opening in the front face 80a and the rear face 80b of the body.

A rotatable collimator slit member 85 of radiation impervious or opaque material is rotatably mounted in the cavity 81 so as to be rotatable about axis 82. The member 85 has a slit 86 through said rotatable collimator slit member and parallel to the cavity axis 82. As is preferred the slit 86 has a knife-edge profile between two opposed portions 87, 88 that between them delimit the slit.

The collimator system further comprises a rotation drive (see e.g. FIG. 5) for rotating the rotatable collimator slit member 85. The member 85 is rotatable in the cavity around the axis 82 in a first position (see FIG. 8) in which high energy radiation is able to pass through the slit 86 from the detection volume to the detection surface, and in a second position in which high energy radiation is blocked from going from the detection volume to the detection surface. Preferably the first and second position differing by a rotation over substantially a right angle.

FIG. 8 also illustrates the proposal to provide for an adjustability of the width of the slit 86. Herein at least one of the portions 87, 88 is movable relative to the opposed portion and a width variation mechanism is provided to adjust the width of the slit 86.

In this example the member 85 includes a rotatable base 89, with at least one portion, here both portions 87, 88, being mobile supported relative to the base 89 to allow for slit width adjustment. In this example the portions 87, 88 are each translatable relative to the base 89 by means of a mechanism, in this example an actuator, e.g. a piezo-actuator 90 being arranged between each portion and the base 89.

It will be appreciated that if no rotation of member 85 is desired, one can still make use of the mentioned slit width variation in the context of the present invention.

FIG. 8 also depicts the proposal to arrange in a radiation impervious material body 80 a pair of slits of which a first slit 86 is formed by said rotatable collimator slit member 85 and of which a second slit 92 is arranged parallel to said first slit 86, preferably said second slit being embodied as a fixed width stationary slit 92, preferably with a knife-edge, in the body of radiation impervious material or as a variable width slit collimator.

FIG. 8 also illustrates the proposal to provide one or more of the slits 92 with a shutter 93 and a shutter actuator 94 allowing to open or close the slit as desired.

The specific embodiments shown here are to be understood merely as a non-limiting explanation of the invention, whose scope is defined by the appended claims.

The invention claimed is:

1. Detection apparatus for detecting high energy radiation coming from a source of high energy radiation in a detection volume, said apparatus comprising:
   at least one position sensitive detector having a detection surface and being configured to convert high energy radiation incident on said detection surface into a detection signal including position information of incident radiation, and
   a collimator system comprising at least three collimator slits, each collimator slit having a slit field of view and being arranged to project high energy radiation coming from said source of high energy radiation in said detection volume onto said detection surface as a line-shaped irradiation thereon,
   wherein said at least three collimator slits respectively extend in an x-axis, y-axis, and z-axis direction, said x-axis, y-axis, and z-axis being orthogonal to one another, wherein the respective slit fields of view of said at least at least three collimator slits define a common detection volume of the detection apparatus,
   a processing unit adapted to determine a coordinate along each of said x-axis, y-axis, and z-axis directions for said source of high energy radiation in said detection volume on the basis of said position information of incident radiation coming from said source of high energy radiation and projected through said respective collimator slit on the detection surface.

2. Detection apparatus according to claim 1, wherein said detection surface comprises an array of scintillation elements in side-by-side arrangement, each sub-detector being elongated and being arranged substantially parallel to the collimator slit via which said sub-detector is reachable by said high energy radiation.

3. Detection apparatus for detecting high energy radiation coming from a source of high energy radiation in a detection volume, said apparatus comprising:
   three position sensitive cameras, each camera having a collimator slit and a position sensitive detector, wherein said collimator slit has a slit field of view and wherein said detector has a detection surface, wherein said collimator slit is arranged to project high energy radiation coming from said source of high energy radiation in said slit field of view of said detection volume onto said detection surface as a line-shaped irradiation thereon, and wherein said detector is configured to convert said high energy radiation incident on said detection surface into a detection signal including position information of said incident radiation,
   wherein said three cameras are arranged such that said collimator slits of at least two of said cameras extend in orthogonal directions, wherein the respective slit fields of view of said at least two orthogonal collimator slits and the slit field of view of any other of said at least three collimator slits overlap and define a common detection volume of the detection apparatus.

4. Detection apparatus according to claim 3, wherein said three position sensitive cameras are arranged in a U-formation with parallel legs or with non-parallel widening legs.

* * * * *